United States Patent
Yang et al.

(10) Patent No.: US 7,100,087 B2
(45) Date of Patent: Aug. 29, 2006

(54) MODULE AND METHOD FOR AUTOMATIC RESTORING BIOS DEVICE

(75) Inventors: Jen-Tsung Yang, Taipei (TW); Wen-Bin Jian, Taipei Hsien (TW)

(73) Assignee: ASUSTeK Computer Inc., Taipei (TW)

( * ) Notice: Subject to any disclaimer, the term of this patent is extended or adjusted under 35 U.S.C. 154(b) by 573 days.

(21) Appl. No.: 10/329,683

(22) Filed: Dec. 27, 2002

(65) Prior Publication Data

US 2003/0126511 A1 Jul. 3, 2003

(30) Foreign Application Priority Data

Dec. 28, 2001 (TW) ............................... 90132831 A

(51) Int. Cl.
*G06F 11/00* (2006.01)

(52) U.S. Cl. .................. 714/36; 713/1; 713/2
(58) Field of Classification Search ............ 714/36
See application file for complete search history.

(56) References Cited

U.S. PATENT DOCUMENTS

| | | | | |
|---|---|---|---|---|
| 5,509,120 A | * | 4/1996 | Merkin et al. ............... | 726/24 |
| 5,835,695 A | * | 11/1998 | Noll ........................... | 714/6 |
| 5,964,873 A | * | 10/1999 | Choi ........................... | 713/2 |
| 6,651,188 B1 | * | 11/2003 | Harding et al. ............ | 714/38 |
| 6,681,390 B1 | * | 1/2004 | Fiske ......................... | 717/173 |
| 6,865,669 B1 | * | 3/2005 | Mahmoud ................... | 713/1 |

FOREIGN PATENT DOCUMENTS

| | | |
|---|---|---|
| TW | 454254 | 5/1987 |
| TW | 428748 | 7/1987 |
| TW | 446864 | 5/1988 |

* cited by examiner

*Primary Examiner*—Robert Beausoliel
*Assistant Examiner*—Yolanda L. Wilson
(74) *Attorney, Agent, or Firm*—Birch, Stewart, Kolasch, and Birch, LLP

(57) ABSTRACT

A BIOS module for automatic restoring and the related method are provided. The BIOS module has a BIOS memory and a prime BIOS code embedded therein. When the contents of a BIOS memory is damaged, a backup BIOS code can be loaded from other storage media for rebooting the computer system. The BIOS code comprises a BIOS function program module having a compressed function program, a detecting means for detecting the correctness of the BIOS function program module, a restoring module responsive to the detecting means for automatic rebooting the computer when the decompressing procedure has errors to load and execute the BIOS backup code from other storing media. And after rebooting the computer system successfully the restoring module also can restore the BIOS backup code into the BIOS memory. Besides, a differentiating means is applied to check the versions of the backup BIOS code and the prime BIOS code. When the prime BIOS code can boot the computer system successfully and the version thereof is latest than that of the backup BIOS code, the prime BIOS code can be backuped to the storage media.

15 Claims, 3 Drawing Sheets

MODULE AND METHOD FOR AUTOMATIC RESTORING BIOS DEVICE

FIELD OF THE INVENTION

The present invention relates to a BIOS (basic input output system) device, and more specifically, to a BIOS module and the related method for loading a backup BIOS code from storage media to reboot a system and to automatically restore the BIOS memory when the content thereof is damaged.

BACKGROUND OF THE INVENTION

With the advancement of electronic techniques and the development of internet communication, multimedia computers become one of the popular electronic products. In each computer, a BIOS device mounted on the motherboard is applied to serve as a communicating interface between the hardware and the operating system of the computer. By executing the BIOS code stored in the BIOS memory some instructions are performed to boot the computer. These instructions comprise of configuring the CPU; testing the DRAM; initializing the chipset and peripheral equipments; and driving the soft disks and hard disks; then loading the operating system such as DOS, Windows or Linux. After above booting procedures are completed, the BIOS device proceed to do some coordination works for assisting the operating system or application program in communications among the peripheral equipments. Therefore, no matter what type of computer, notebook or desktop, only the content of the BIOS memory is valid and correct, the computer can be booted successfully into the required operating system, and the hardware can be initialized and tested to ensure being in normal state.

According to maintain service records of computers, the damage of BIOS device or flash ROM is the main cause that the computers can not be booted successfully. And exceptless BIOS devices can not be repaired due to physical damage, most of them can be repaired by service engineers applying some specific kit or procedures. However for most consumers whose computers are unable to boot, they have not the proper kit and related knowledge to handle it by themselves. Therefore these consumers have to send their computers to the maintain stations for repairing. And that causes interference for the daily works of consumers and increases maintain cost.

For solving above issues, some methods like using two BIOS ROM or adding storage space of the ROM are provided. For example, in Taiwan patent issue No. 446864, a method to automatic backup BIOS is disclosed, wherein the space of BIOS ROM is increased to contain an extra restoring BIOS code. If some errors occur in the booting procedures, the restoring BIOS code is automatically loaded to reboot the computer again. The method can prevent the BIOS device from damaging by consumers because they maybe try to fix it. However the cost of BIOS devices will increase because it is required to increase space of the BIOS ROM.

Besides, in Taiwan patent issue No. 428748, the design of mounting two sets of BIOS devices simultaneously on one motherboard is disclosed, wherein a logic circuit and a differentiating circuit are introduced to switch on another BIOS device for rebooting the computer when one BIOS device is damaged in operation. However, similar to above method, such design will cause the prime cost increased due to adding the physical components such as the differentiating circuit, the logic circuit, and an extra BIOS device on the motherboard.

In Taiwan patent issue No. 454145, a switching interface is introduced to control and substitute the BIOS device on the motherboard. By adding an extra memory for storing the backup BIOS code and the switching interface on the motherboard, according to the operation state of the BIOS device the switching interface can determine to switch the booting priority to the extra backup memory or not for solving the failure of the BIOS device. However it also causes cost increasing due to the extra memory and the switching interface.

Except for the increasing cost due to the extra components, memories, interfaces as mentioned above, the conventional BIOS backup apparatuses also are short of friendness in operation for consumers. In the typical design to backup and restore BIOS, consumers have to pick up and execute instructions from the menu on a screen panel or to disassemble the computer case for replacing the new components. For example, when the BIOS device booting fails, the appearance on screen will change to an operating menu and the consumers are demanded to decide whether or not rebooting again by the backup BIOS code and restoring the BIOS code to repair the damaged BIOS device. However, it is a real torment to most consumers to understand what meanings of the instructions on the menu and make the proper choice based on that.

Even more, in some BIOS backup design, the consumers are demanded to switch a jumper on the motherboard for activating the backup BIOS device or to plug some components provided by the motherboard manufacturing company into the slot panels on the computer cases. And these methods are real persecutions to consumers. Therefore most consumers would rather send the computers to the maintain stations for saving their useless mental and physical efforts. However, the manufacturing companies have to spend lots of cost and manpower on fixing the BIOS devices and serving the consumers.

SUMMARY OF THE INVENTION

The present invention provides a BIOS module for executing a restoring procedure to load a backup BIOS program from other storage media and to reboot the system when the prime BIOS code in the BIOS memory is damaged.

The present invention also discloses a new design to automatic and real-time backup the latest and valid BIOS code.

The present invention discloses a prime BIOS code of automatic restoring. The prime BIOS code is stored in a BIOS flash memory to boot a system. And when the content of the BIOS flash memory is damaged, a backup BIOS code can be loaded from other storage media to reboot the system. The prime BIOS code comprises the following components. A boot block has a booting program for booting the system is applied to perform the correctness checking and restoring procedures for the content of the BIOS memory. A decompress module is applied to decompress compressed programs stored in the BIOS memory and to check the correctness of the compressed programs. A POST (Power On Self Testing) block having a compressed BIOS POST code is applied to perform self-testing procedures for hardware, software and peripheral equipments of the system after being decompressed by the decompress module. A Run-Time block has a compressed BIOS function service code which can be decompressed by the decompress module. And an automatic restoring module is applied to detect the decompressing procedures of the decompressed module, the POST module, and the Run-Time module. When the prime BIOS code is applied to boot the system, the automatic restoring module can reboot the system to load and execute the backup BIOS code, and rewrite the backup BIOS code into the BIOS memory after rebooting successfully.

Basing on the above automatic restoring code, the present invention also provides a booting method for detecting, restoring and backup a BIOS code stored in a BIOS memory. According to the booting method, a backup BIOS code can be loaded from other storage media to reboot a system when the content of the BIOS memory is damaged. The contents of the BIOS memory comprise a decompress module, a POST module and a Run-Time module. The booting method comprises the following steps: checking if the content of the decompress module is valid and then setting the system into an automatic restoring mode when the content of the decompress module is invalid; performing decompressing procedures to decompress the POST module and the Run-Time module; detecting the decompressing procedures to determine if there is any error occurring; forcing the system to reboot again when there is an error in the decompressing procedures and to enter into the automatic restoring mode; loading the backup BIOS code from the storage media when the system is in the automatic restoring mode; executing the backup BIOS code to decompress and execute the POST module and the Run-Time module for booting the system; rewriting the backup BIOS code into the BIOS memory when the system is booted successfully in the automatic restoring mode; differentiating versions of the prime BIOS code and the backup BIOS code; backuping the prime BIOS code into the storage media when the prime BIOS code has a latest version rather than that of the backup BIOS code; and loading and executing an operating system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
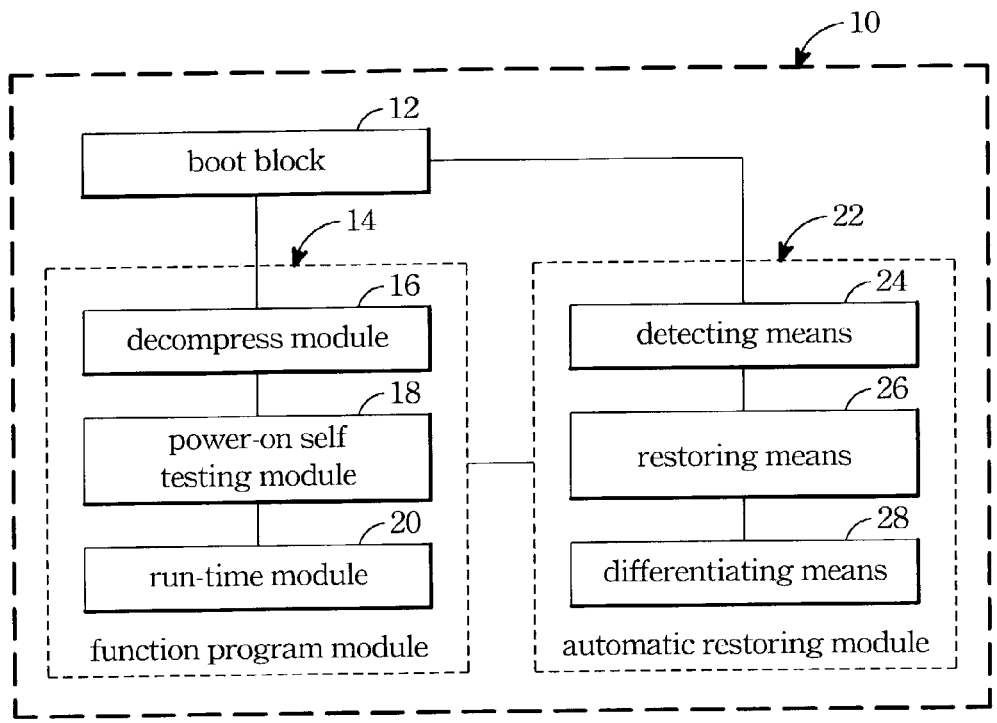
FIGS. 1 & 2 illustrate the content frame of the BIOS code provided by the present invention for automatic performing restoring procedures.

Please refer to FIG. 1, the content frame of a BIOS code 10 for automatic performing restoring procedures provided by the present invention is illustrated. The BIOS code 10 is stored in a BIOS memory of the BIOS module, such as the BIOS ROM constituted by a Flash or an EEPROM device. When consumers boot the system, the BIOS code is loaded from the BIOS memory to execute booting and testing procedures. And for the purpose of rebooting the system by loading a backup BIOS code from other storage media (ex. a hard disk) when the content of the BIOS memory is damaged, it is required to pre-store the backup BIOS code into the related storage media.

Similar to the BIOS design in prior art, the BIOS code 10 also comprises a boot block 12 and a function program module 14. In the boot block 12 the initiating program for booting the system is stored for performing the correctness checking and repairing steps to the content of the BIOS memory. In general, the programs in the boot block 12 are protected by specific hardware or software against arbitrary or incautious changes. For example, an IC chip can be introduced into the BIOS memory to protect the boot block 12 against non-anticipated writing.

As to the function program module 14 therein the compressed function service programs and the decompressing programs are stored. As shown in FIG. 1, the function program module 14 comprises a decompress module 16, a POST (Power-On Self Testing) module 18 and a Run-Time module 20. The decompress module 16 is applied to decompress the function service programs stored in the BIOS memory and to automatically check the correctness of the compressed BIOS content. And the POST module 18 therein stored are the compressed POST programs which can execute the self testing procedures for the hardware, software and peripheral equipments of the system after being decompressed by the decompress module 16. Besides, the Run-Time module 20 therein stored are compressed BIOS function/run-time codes which can provide related function services after being decompressed by the decompress module 16.

It is noted that an automatic restoring module 22 is introduced in the BIOS memory to detect the executing state of the above function program module 14. When the BIOS code is failed to boot the system, the automatic restoring module 22 can load the backup BIOS code from the storage media and reboot the system again to load an operating system. Still refer to FIG. 1, in one embodiment of the present invention, the automatic restoring module 22 comprises a detecting means 24, a restoring means 26 and a differentiating means 28. The detecting means 24 is applied to check if there is any error occurring in the decompressing procedures of the decompress module 16, the POST module 18 and the Run-Time module 20.

When any error occurs in the decompressing procedures, the restoring means 26 can automatically execute the above rebooting procedures to load and execute the backup BIOS code. And after the backup BIOS code rebooting the system successfully is confirmed, the restoring means 26 can restore the backup BIOS code into the BIOS memory again. Besides, the differentiating means 28 can check the versions of the backup BIOS code and the prime BIOS code stored in the BIOS memory. If the prime BIOS code which can boot the system successfully has a latest version rather than that of the backup BIOS code, the prime BIOS code will be rewritten into the storage media for updating and reform a new backup BIOS code.

Figure 2:
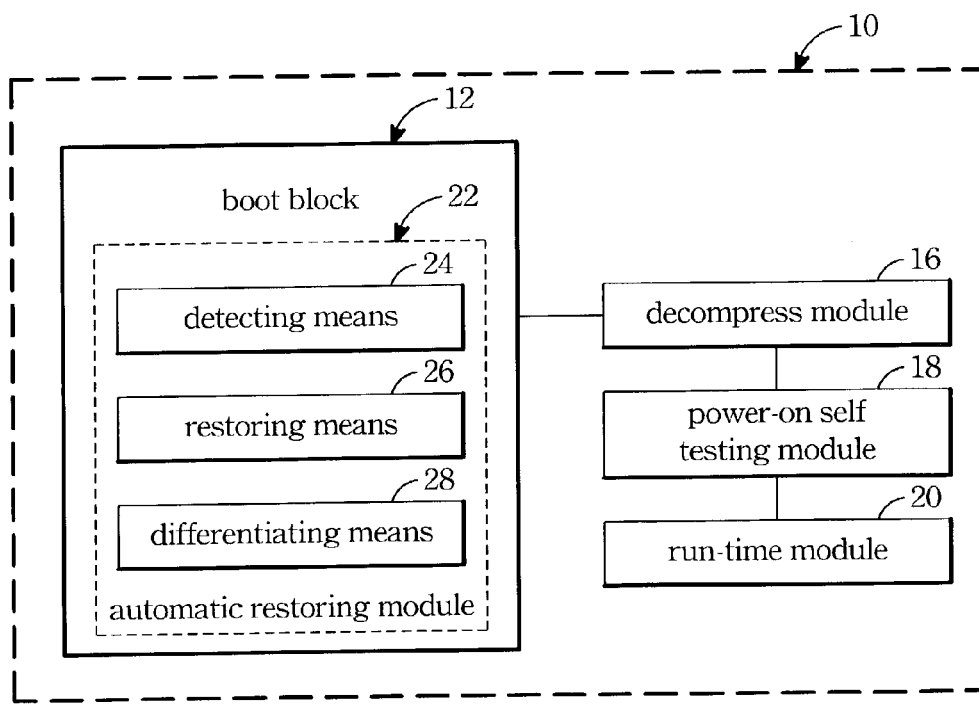

It is noted that the automatic restoring module 22 can be embedded into the boot block 12 for preventing it from damage in improper operations. Please refer to FIG. 2, the detecting means 24, the restoring means 26 and the differentiating means 28 are embedded in the boot block 12. Namely the whole automatic restoring module 22 can be integrated in the boot block 12 to have the detecting, restoring and differentiating functions. Under this condition, except the well known checksum method, the methods for automatic checking errors provided by the present invention also comprise the steps of checking the sizes of the related modules and the CRC (cyclic redundancy check) after the BIOS code performing the decompressing procedures. In addition, if the BIOS device is failed to complete the POST steps, the detecting means 24 can also detect it and regard it as an error. Of course, based on the requirement for design, the detecting means, the restoring means and the differentiating means can be wholly or partly embedded in the boot block 12.

Figure 3:
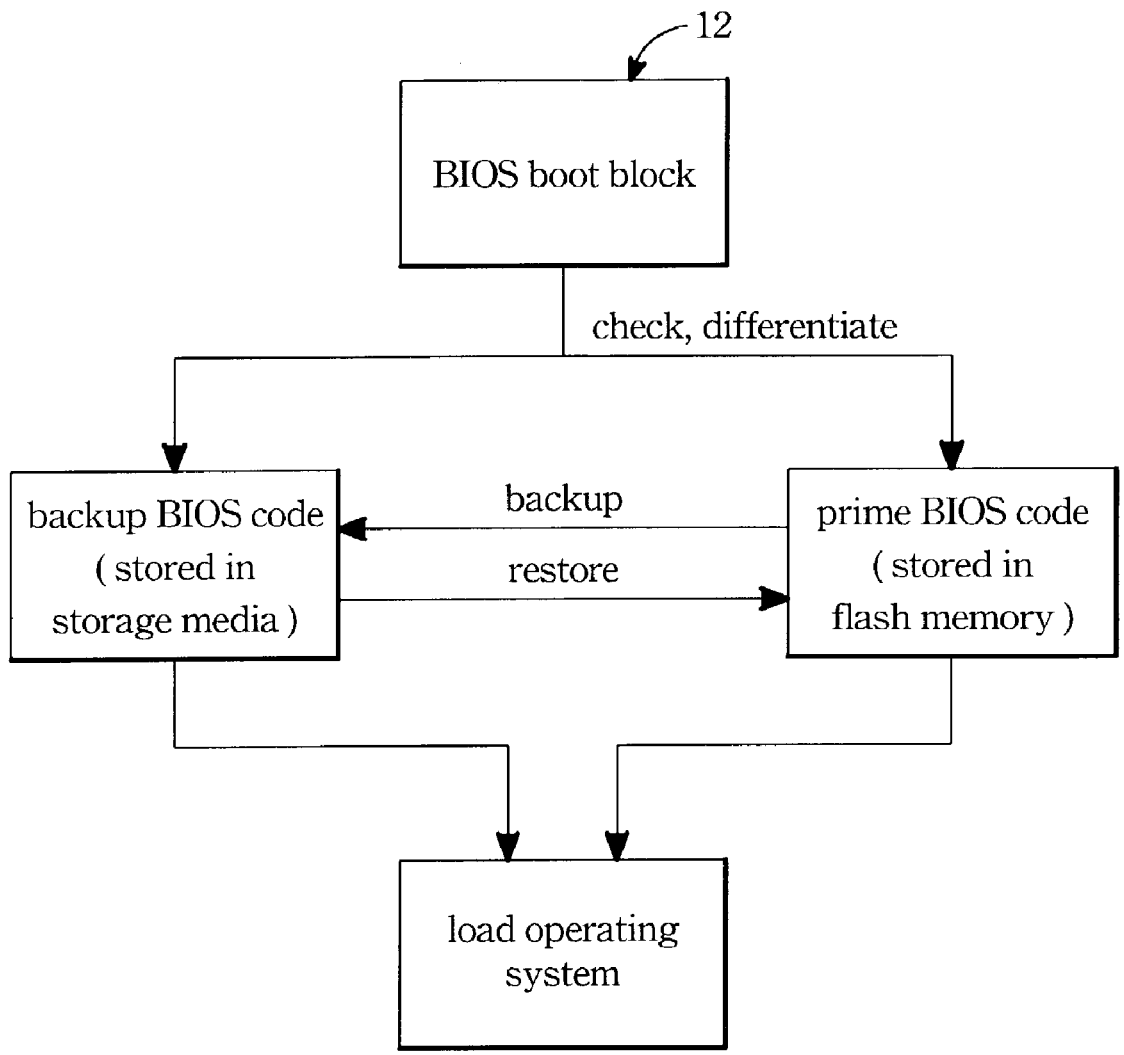
FIG. 3 illustrates the disposing of the means and modules introduced in the present invention.

Please refer to FIG. 3, the disposing of above means and modules are shown. The boot block 12 of the BIOS device will check the prime BIOS code stored in the flash memory and differentiate the versions of the prime BIOS code and the backup BIOS code. If the prime BIOS code has an error and is failed to load the operating system, the boot block 12 can load the backup BIOS code stored in the storage media and reboot the system. And after the system is rebooted successfully and the operating system is loaded smoothly, the backup BIOS code can be rewritten to the BIOS memory. Especially, if the prime BIOS code which can boot the system successfully has a latest version rather than that of the backup BIOS code, the prime BIOS code can be rewritten into the storage media for updating and reform a new backup BIOS code.

Figure 4:
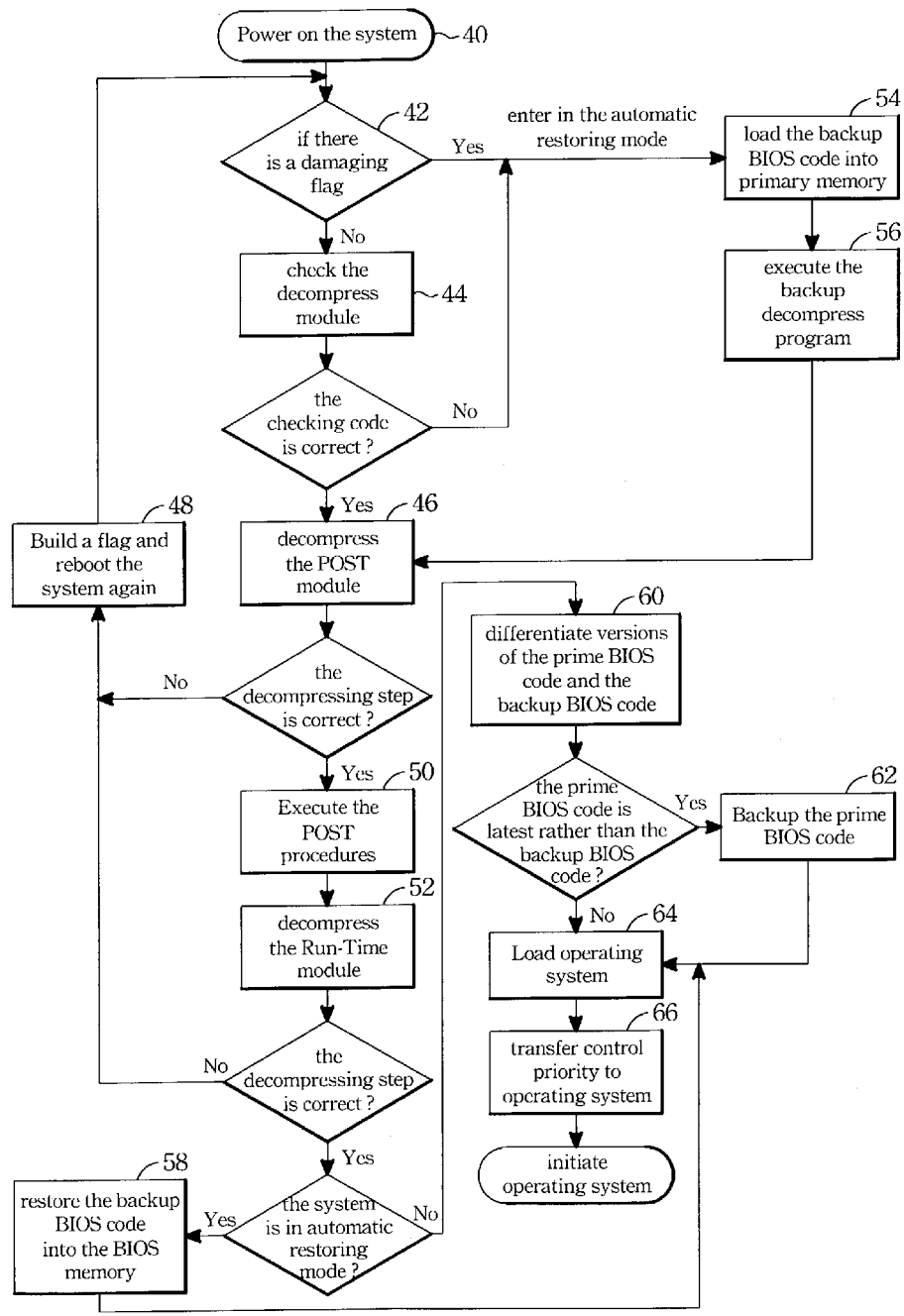
FIG. 4 illustrates the flow charts of detecting, restoring and backup procedures by executing the automatic restoring means disclosed in the present invention.

Refer to FIG. 4, the steps of detecting, restoring and backup by using the automatic restoring module 22 are illustrated. When the system is powered on for booting (step 40), the detect means 24 will check if there is a flag showing the content of the BIOS memory is damaged (step 42). When the BIOS memory is damaged, the detect means 24 will set the system into an automatic restoring mode. On the contrary, the detect means 24 will check if the decompress module 16 is correct (step 44). If the decompress module 16 is incorrect, the system will be set into the automatic restoring mode. On the contrary, the decompress module 16 will be executed to decompress and load the POST module 18 to a predetermined location (step 46).

In performing the decompressing steps, if there is any error occurring, such as the system can not find the modules required to be decompressed, or the size or checking code of the module after decompressing procedure does not conform to the records, the content of the BIOS memory is regarded to be damaged. At this time, a flag is established to show the content of the BIOS memory is damaged and the system is forced to reboot again (step 48). And when the boot block 12 of the BIOS memory is restarted, the detecting means 24 will set the system into the automatic restoring mode based on the flag. On the other hand, when the POST module is decompressed to a predetermined location and is confirmed to be correct, the POST procedures will be executed (step 50). Then, the Run-Time module 20 is decompressed (step 52) and detected if there is any error. When the decompressed Run-Time module 20 has any error, the step 48 is performed to establish a flag and reboot the system again. It is noted that in the POST procedures, the decompressing program in the POST module can be executed repeatedly. And in each the decompressing step, the detecting means 24 will perform above detecting procedure to determine whether the content of the BIOS memory is damaged.

When the detecting means 24 detects the flag or any error occurring in the decompressing procedure, the system will be set into the automatic restoring mode. At this moment, the restoring means 26 will load the backup BIOS code stored in storage media into the primary memory (step 54) and execute the backup BIOS code to substitute for the prime BIOS code. In a preferred embodiment, the loaded backup BIOS code comprises the above decompress module, the POST module and the Run-Time module. Therefore, the restoring means 26 will execute the backup decompress program (step 56) to decompress the POST module and the Run-Time module.

If the whole testing procedures of the BIOS booting are completed correctly and the operating system is loaded smoothly, a step is then done to determine whether the system has entered in the automatic restoring mode. If the system has entered in the automatic restoring mode, it is evident that the content of the BIOS memory has some damage. So the restoring means 26 will restore the backup BIOS code in the storage media to the BIOS memory (step 58). On the contrary, if the system has not entered into the automatic restoring mode, it illustrates there is no damage or crash occurring in the BIOS memory. Then the step 60 is done to differentiate the versions of the prime BIOS code in the BIOS memory and the backup BIOS code in the storage media. If the prime BIOS code has a latest version than the backup BIOS code, the content of the BIOS memory will be rewritten to the specific area of the storage media for updating data therein (step 62). Thus, even the hardware of the BIOS memory is damaged, the backup BIOS code still can boot the system smoothly. And next the operating system will be loaded (step 64) to get the control priority of the system (step 66).

Because the backup BIOS code loaded in the step 54 is the latest and valid prime BIOS code rewritten into the storage media, so even if the content of the BIOS memory is damaged, the backup BIOS code still can be applied to replace for the damaged content of the BIOS memory for booting the system successfully. And when the execution of the loaded code reaches the stage of BIOS POST, the system environment can perform the writing procedure to restore the BIOS memory. At this moment, if the system is confirmed to be in the automatic restoring mode, the writing procedure is done to restore the loaded backup BIOS code into the BIOS memory. And even the writing procedure is failed the system still can execute the following BIOS POST procedures and the operating system loading procedures to boot the system successfully.

The design and means provided by the present invention has some advantages as follows:

(1) because the valid BIOS code will be automatically backuped ordinarily basing on the design of the present invention, the backup BIOS code which is the latest backup can be loaded from the storage media to reboot the system when the BIOS memory is damaged. Thus, the backup BIOS code can real-time reflect the current configuring states of the system.

(2) because the system can automatically detect the error of the BIOS and automatically perform the restoring steps, for the consumers they do not need to spend time or effort on manual operating to have the BIOS error solved.

(3) because the most issues of BIOS error can be solved by the present invention, for the manufacturing company they do not need to consume lots of cost and manpower for fixing the BIOS devices and serving the consumers.

(4) further, because the automatic restoring function in the present invention can be embodied into the BIOS module just by modifying the BIOS code, no extra physical component is required to fix the BIOS memory.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar design.

What is claimed is:

1. A BIOS module for automatic restoring a BIOS data, comprising a BIOS memory and a prime BIOS code stored therein, wherein said prime BIOS code can perform an automatic restoring procedure to load a backup BIOS code from other storage media to reboot a system when the content of the BIOS memory is damaged, said prime BIOS code comprising:
    a boot block, having a booting program for booting the system to check the correctness of the content of said BIOS memory;
    a decompress module, for decompressing compressed programs stored in said BIOS memory and for checking the correctness of said compressed programs;
    a POST (Power-On Self Testing) block, having a compressed BIOS POST code which is applied to perform self testing procedures for hardware, software and peripheral equipments of the system after being decompressed by said decompress module;
    a Run-Time block, having a compressed function service code which can be decompressed by said decompress module; and
    an automatic restoring module, wherein said automatic restoring module comprises:
    a detecting means for detecting decompressing procedures of said decompress module said POST module and said Run-Time module to determine if there is any error occurring therein; a restoring means, responsive to said detecting means, for rebooting the system to load and execute said backup code, and said restoring means can restore said backup BIOS code into said BIOS memory after rebooting successfully; and
    a differentiating means for differentiating versions of said backup BIOS code and said prime BIOS code, if said prime BIOS code which can boot the system successfully has a latest version rather than that of said backup BIOS code, said prime BIOS code can be backuped into said storage media for updating said backup BIOS code.

2. The BIOS module of claim 1, wherein said automatic restoring module can:
    differentiate versions of said prime BIOS code and said backup BIOS code after said prime BIOS code boots the system successfully; and
    rewrite said prime BIOS code into said storage media to update said backup BIOS code when said prime BIOS code has a latest version rather than that of said backup BIOS code.

3. The BIOS module of claim 1, wherein said storage media comprises a hard disk.

4. A BIOS module for automatic restoring a BIOS data, comprising a BIOS memory and a prime BIOS code embedded therein, wherein said prime BIOS code can load a backup BIOS code from other storage media to reboot a system successfully when the content of said BIOS memory is damaged, said BIOS code comprising:
    a function program module, having compressed function programs for providing a self-testing program and a Run-Time program after being decompressed;
    a detecting means for detecting a decompressing procedure of said function program module to determine if there is any error occurring; a restoring means, responsive to said detecting means, for automatical rebooting the system when there is an error occurring in said decompressing procedure to load and execute said backup BIOS code from said storage media, said restoring means also restore said backup BIOS code into said BIOS memory after the system is rebooted successfully; and
    a differentiating means for differentiating versions of said backup BIOS code and said prime BIOS code, if said prime BIOS code which can boot the system successfully has a latest version rather than that of said backup BIOS code, said prime BIOS code will be rewritten into said storage media for updating said backup BIOS code.

5. The BIOS module of claim 4, wherein said storage media comprises a hard disk.

6. The BIOS module of claim 4, further comprises a boot block with a booting program which is applied to check the correctness of the content of said BIOS memory.

7. The BIOS module of claim 6, wherein said detecting means is embedded in said boot block.

8. The BIOS module of claim 6, wherein said restoring means is embedded in said boot block.

9. The prime BIOS code of claim 6, wherein said differentiating means is embedded in said boot block.

10. The BIOS module of claim 4, wherein said function program module comprises:
    a decompress module, for decompressing compressed programs stored in said BIOS memory and for checking if contents of said compressed programs are correct;
    a POST (Power On Self Testing) block, having a compressed BIOS POST code to perform self testing procedures for hardware, software and peripheral equipments of the system after being decompressed by said decompress module; and
    a Run-Time block, having a compressed function service code which can be decompressed by said decompress module.

11. A method for detecting, restoring and backing-up a BIOS code stored in a BIOS memory to load a backup BIOS code from other storage media to reboot a system when the content of said BIOS memory is damaged, said BIOS memory in which stored comprising a decompress module, a POST module and a Run-Time module, said method comprising the steps of:
    checking if contents of said decompress module are correct and setting the system into an automatic restoring mode when the contents of said decompress module are incorrect;
    performing decompressing procedures to decompress said POST module and said Run-Time module;
    detecting said decompressing procedures to determine if there is any error occurring;
    forcing the system to reboot again when there is an error in said decompressing procedures and to enter into the automatic restoring mode; loading said backup BIOS code from said storage media when the system is in the automatic restoring mode;
    executing said backup BIOS code to decompress and execute said POST module and said Run-Time module for rebooting the system; rewriting said backup BIOS code into said BIOS memory when the system is rebooted successfully in said automatic restoring mode;

differentiating versions of said prime BIOS code and said backup BIOS code;

restoring said prime BIOS code into said storage media when said prime BIOS code has a latest version rather than that of said backup BIOS code; and loading an operating system.

12. The method of claim 11, further comprises a step to establish a flag before the step of forcing the system to reboot again.

13. The method of claim 12, further comprises steps of checking if there is a flag before the step of checking if the contents of said decompress module are correct, and setting the system into the automatic restoring mode when there is a flag.

14. The method of claim 11, wherein said backup BIOS code comprises said decompress module, said POST module and said Run-Time module.

15. The method of claim 12, wherein said storage media comprises a hard disk.

* * * * *